(12) United States Patent
Jakobsson (10) Patent No.: US 11,057,099 B2
(45) Date of Patent: Jul. 6, 2021

(54) COMMUNICATION CIRCUIT FOR MULTI-ANTENNA APPARATUS

(71) Applicant: Telefonaktiebolaget LM Ericsson (publ), Stockholm (SE)

(72) Inventor: Peter Jakobsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/085,987

(22) PCT Filed: Mar. 18, 2016

(86) PCT No.: PCT/EP2016/056038
§ 371 (c)(1),
(2) Date: Sep. 17, 2018

(87) PCT Pub. No.: WO2017/157471
PCT Pub. Date: Sep. 21, 2017

(65) Prior Publication Data
US 2019/0089448 A1    Mar. 21, 2019

(51) Int. Cl.
*H04B 1/40* (2015.01)
*H04B 7/08* (2006.01)
(Continued)

(52) U.S. Cl.
CPC ........... *H04B 7/0837* (2013.01); *H01Q 21/30* (2013.01); *H04B 1/0064* (2013.01); *H04B 1/18* (2013.01);
(Continued)

(58) Field of Classification Search
CPC ........... H04L 27/2601; H04L 25/03343; H04L 5/001; H04L 2025/03414;
(Continued)

(56) References Cited

U.S. PATENT DOCUMENTS

| | | | |
|---|---|---|---|
| 6,243,412 B1 * | 6/2001 | Fukawa | H01Q 1/246 375/219 |
| 7,079,869 B2 * | 7/2006 | Aytur | H01Q 21/00 455/562.1 |

(Continued)

FOREIGN PATENT DOCUMENTS

| | | |
|---|---|---|
| CN | 104770030 A | 7/2015 |
| EP | 2299774 A1 | 3/2011 |

(Continued)

OTHER PUBLICATIONS

PCT International Search Report, dated Nov. 16, 2016, in connection with International Application No. PCT/EP2016/056038, all pages.

(Continued)

*Primary Examiner* — Rahel Guarino (74) *Attorney, Agent, or Firm* — Patent Portfolio Builders PLLC (57) ABSTRACT

A communication circuit for communication at a carrier frequency via multiple antenna elements of a radio apparatus is disclosed. The communication circuit comprises a plurality of radio units, wherein each radio unit of said plurality of radio units is arranged to be connected to a separate antenna element. An LO signal generation unit is arranged to generate a plurality of LO signals at distinct frequencies, and supply a unique LO signal of the plurality of LO signals to each radio unit of the plurality of radio units. A corresponding radio apparatus and method are also disclosed.

16 Claims, 6 Drawing Sheets

(51) Int. Cl.
*H04B 1/00* (2006.01)
*H01Q 21/30* (2006.01)
*H04B 1/18* (2006.01)
*H04L 5/00* (2006.01)
*H04L 5/06* (2006.01)

(52) U.S. Cl.
CPC .............. *H04B 1/40* (2013.01); *H04L 5/001* (2013.01); *H04L 5/06* (2013.01)

(58) Field of Classification Search
CPC ....... H04L 2025/03426; H04L 25/0204; H04L 5/06; H04B 7/0413; H04B 7/04; H04B 1/44; H04B 1/0483; H04B 7/0837; H04B 1/40; H04B 1/0064; H04B 1/18; H01Q 21/30

See application file for complete search history.

(56) References Cited

U.S. PATENT DOCUMENTS

| | | | |
|---|---|---|---|
| 10,193,603 | B2 | 1/2019 | O'Keeffe et al. |
| 2002/0080728 | A1 | 6/2002 | Sugar et al. |
| 2006/0014513 | A1 | 1/2006 | Uozumi et al. |
| 2011/0044313 | A1 | 2/2011 | Jeong et al. |
| 2012/0076229 | A1 | 3/2012 | Brobston et al. |
| 2012/0076241 | A1 | 3/2012 | Rajendran et al. |
| 2012/0224646 | A1 | 9/2012 | Purohit et al. |
| 2013/0051284 | A1 | 2/2013 | Khlat |
| 2013/0188755 | A1 | 7/2013 | Lu et al. |
| 2013/0188756 | A1 | 7/2013 | Sundstrom et al. |
| 2013/0196673 | A1 | 8/2013 | Smadi et al. |
| 2014/0259853 | A1 | 9/2014 | Crispin |
| 2014/0269853 | A1 | 9/2014 | Gudem et al. |
| 2015/0003436 | A1 | 1/2015 | Shapira |
| 2015/0123873 | A1 | 5/2015 | Perumana et al. |
| 2015/0237626 | A1 | 8/2015 | Li et al. |
| 2016/0285617 | A1 | 9/2016 | Van der Goes et al. |
| 2016/0337677 | A1 | 11/2016 | Lee |
| 2017/0195054 | A1 | 7/2017 | Ashrafi |
| 2018/0083816 | A1 | 3/2018 | Bolstad et al. |
| 2019/0097662 | A1 | 3/2019 | Hornbuckle et al. |
| 2020/0274561 | A1 | 8/2020 | Jakobsson et al. |

FOREIGN PATENT DOCUMENTS

| | | |
|---|---|---|
| KR | 1020090114336 A | 11/2009 |
| KR | 1020130130064 A | 11/2013 |
| WO | 2011002790 A1 | 1/2011 |

OTHER PUBLICATIONS

PCT Written Opinion, dated Nov. 16, 2016, in connection with International Application No. PCT/EP2016/056038, all pages.
3GPP TS 36.104 V12.9.0 Sep. 2015, 3rd Generation Partnership Project; Technical Specification Group Radio Access Network; Evolved Universal Terrestrial Radio Access (E-UTRA); Base Station (BS) radio transmission and reception, Release 12, 155 pages.
Ulf Backman, Multi-Branch Integrated Radio and Antenna, Ericsson Confidential ; 62/2882-100/FCP 131 4743 Uen, Rev A; Nov. 9, 2015 ; 65 pages.
Kristina Gold Ekrigol et al., Technology report—Technology trends in radio access RF systems, Ericsson Confidential; GFTE-15:-356 Uen; Jun. 29, 2015, 23 pages.
Examination Report in related/corresponding Indian Application No. 201847034895 dated Aug. 14, 2020.
International Search Report/Written Opinion dated May 30, 2018 in related/corresponding PCT Application No. PCT/EP2017/073334.
Office Action in related/corresponding U.S. Appl. No. 16/646,703 dated Dec. 17, 2020.
Office Action in related/corresponding U.S. Appl. No. 16/646,703 dated Jul. 23, 2020.
Xiaojing Huang et al., "Sample Rate Conversion with Parallel Processing for High Speed Multiband OFDM Systems," IEEE Wireless Communications and Networking Conference (WCNC): PHY, Apr. 7-10, 2013, pp. 2754-2759.
Office Action in related/corresponding European Patent Application No. 16711591.4 dated May 7, 2020.

\* cited by examiner

Fig. 12

COMMUNICATION CIRCUIT FOR MULTI-ANTENNA APPARATUS

TECHNICAL FIELD

The present invention relates to multi-antenna radio communication.

BACKGROUND

Fifth generation (5G) cellular systems will initially be deployed on higher frequencies and with higher carrier bandwidths, then existing state of the art cellular systems, such as fourth generation (4G) cellular systems. One development in cellular communications, leading towards the development of 5G systems, is an increase of the number of antenna elements used especially in base stations. This increase in the number of antenna elements enables efficient multiple-input multiple-output (MIMO) and beamforming schemes to be used. 5G systems are, at least initially, foreseen to be deployed on higher frequencies and with higher carrier bandwidths, than, for instance, 4G cellular systems. The use of an antenna array system (AAS) with multiple antenna elements help overcome the increased path loss between the base station and user equipment (UE) due to the higher frequency. For example, an antenna array with 64 antenna elements can give signal-to-noise ratio (SNR) gain of $10 \log_{10} 64 = 18$ dB, compared with using a single antenna.

Hence, the increased number of antenna elements provides advantages. However, it also poses challenges in terms of hardware design. A straightforward design approach is to use equally configured transmit and receive paths for all antenna elements, which provides for a simple and modular design.

SUMMARY

The inventor has realized that using equally configured transmit and receive paths for all antenna elements can results in a number of imperfections being added in a correlated way, resulting in an overall reduced gain from using multiple antennas. The inventor has further realized that by operating transmitters or receivers connected to different antenna elements at different local oscillator (LO) frequencies, even though they communicate at the same radio frequency (RF) carrier frequency, such problems can be reduced.

According to a first aspect, there is provided a communication circuit for communication at a carrier frequency via multiple antenna elements of a radio apparatus. The communication circuit may e.g. be a transmitter circuit, a receiver circuit, or a transceiver circuit. The communication circuit comprises a plurality of radio units. Each radio unit of said plurality of radio units is arranged to be connected to a separate antenna element. The communication circuit comprises a local oscillator (LO) signal generation unit arranged to generate a plurality of LO signals at distinct frequencies, and supply a unique LO signal of the plurality of LO signals to each radio unit of the plurality of radio units.

The communication circuit may be configured to be used in a radio communications system having an associated frequency grid with a grid spacing. The spacing between any two of the distinct frequencies may be an integer multiple of the grid spacing. Said radio communications system may for instance utilize orthogonal frequency division multiplexing (OFDM), and the grid spacing may be a frequency distance between two adjacent OFDM subcarriers.

In some embodiments, the radio units are receiver units, in which case the LO signals may be supplied to down-conversion mixers of the respective receiver units. The communication circuit may comprise a baseband processing unit configured to receive baseband output signals from the receiver units, frequency align the baseband output signals, and recombine the frequency-aligned baseband output signals.

In some embodiments, the radio units are transmitter units, in which case the LO signals may be supplied to up-conversion mixers of the respective transmitter units. The communication circuit may comprise a baseband processing unit configured to generate baseband transmit signals, frequency shift the baseband transmit signals to account for the distinct LO frequencies, and supply the frequency-shifted baseband transmit signals to the transmitter units.

According to a second aspect, there is provided a radio apparatus. The radio apparatus comprises an antenna array comprising a plurality of antenna elements. Furthermore, the radio apparatus comprises a communication circuit according to the first aspect. Each radio unit of the plurality of radio units of the communication circuit is connected to a unique one of the antenna elements of the antenna array.

The radio apparatus may e.g. be a base station for a cellular communications system.

According to a third aspect, there is provided a method of operating a radio apparatus. The radio apparatus comprises an antenna array with a plurality of antenna elements and a communication circuit for communication at a carrier frequency via the multiple antenna elements. The communication circuit comprises a plurality of radio units, each connected to a separate antenna element. The method comprises generating a plurality of LO signals at distinct frequencies. Furthermore, the method comprises supplying a unique LO signal of the plurality of LO signals to each radio unit of the plurality of radio units.

The communication circuit may be configured to be used in a radio communications system having an associated frequency grid with a grid spacing. The spacing between any two of the distinct frequencies may be an integer multiple of the grid spacing. Said radio communications system may for instance utilize OFDM, and the grid spacing may be a frequency distance between two adjacent OFDM subcarriers.

In some embodiments, the radio units are receiver units. Supplying the LO signals to the receiver units may comprise supplying the LO signals to down-conversion mixers of the receiver units. The method may comprise receiving baseband output signals from the receiver units, frequency aligning the baseband output signals, recombining the frequency-aligned baseband output signals.

In some embodiments, the radio units are transmitter units. Supplying the LO signals to the transmitter units may comprise supplying the LO signals to up-conversion mixers of the transmitter units. The method according may comprise generating baseband transmit signals, frequency shifting the baseband transmit signals to account for the distinct LO frequencies, and supplying the frequency-shifted baseband transmit signals to the transmitter units.

Further embodiments are defined in the dependent claims. It should be emphasized that the term "comprises/comprising" when used in this specification is taken to specify the presence of stated features, integers, steps, or components, but does not preclude the presence or addition of one or more other features, integers, steps, components, or groups thereof.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
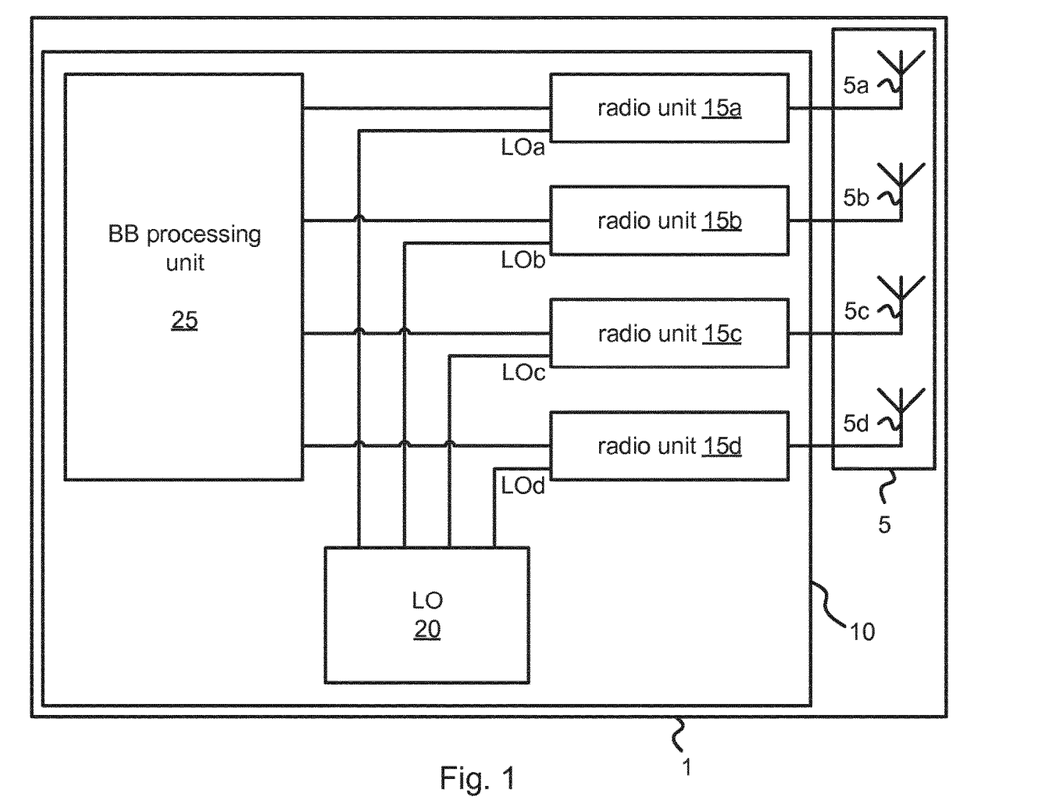
FIG. 1 is a block diagram of a radio apparatus.

FIG. 1 is a block diagram of a radio apparatus 1. As an example throughout this disclosure, the radio apparatus is considered to be a base station for a cellular communications system. In particular, base stations for future 5G cellular communications systems are considered. However, these examples should not be construed as limiting.

In FIG. 1, the radio apparatus 1 comprises an antenna array 5 comprising a plurality of antenna elements 5a-d. In FIG. 1, only four antenna elements 5a-d are depicted for simplicity. However, in practice, the number of antenna elements may be much larger, such as several tens of antenna elements, or even over a hundred antenna elements.

Furthermore, the radio apparatus 1 depicted in FIG. 1 comprises a communication circuit 10. The communication circuit 10 may be a transmitter circuit, a receiver circuit, or a transceiver circuit, and the term communication circuit is intended to generically encompass all these alternatives. The communication circuit 10 is configured to communicate, i.e. transmit or receive, at a carrier frequency via the multiple antenna elements 5a-d of the radio apparatus 1, e.g. in accordance with a beamforming scheme, a multiple-input multiple-output (MIMO) scheme, or some other multi-antenna transmission or reception technique. The communication circuit 1 comprises a plurality of radio units 15a-d. The radio units 15a-d may be transmitter units or receiver units. Each radio unit 15a-d is arranged to be connected to a separate antenna element 5a-d. In FIG. 1, the radio unit 15a is connected to the antenna element 5a, the radio unit 15b is connected to the antenna element 5b, the radio unit 15c is connected to the antenna element 5c, and the radio unit 15d is connected to the antenna element 5d. Furthermore, the communication circuit 10 comprises a local oscillator (LO) signal generation unit 20 arranged to generate a plurality of LO signals LOa-d. The LO signal generation unit 20 may e.g. comprise a plurality of phase-locked loops (PLLs), or other type of synthesizers, each responsible for generating one of the LO signals. Furthermore, the LO signal generation unit is configured to supply a unique LO signal of the plurality of LO signals LOa-d to each radio unit of the plurality of radio units. For simple notation, the LO signal LOa is supplied to the radio unit 15a, the LO signal LOb is supplied to the radio unit 15b, the LO signal LOc is supplied to the radio unit 15c, and the LO signal LOd is supplied to the radio unit 15d.

The communication circuit 10 illustrated in FIG. 1 further comprises a baseband processing unit 25 configured to perform baseband processing tasks on signals received and/or to be transmitted.

Assume for a moment, as a reference example, that all of the LO signals LOa-d have the same frequency, which would be a straightforward and natural choice. The inventor has realized that there are a number of problems with such a selection of frequency. The terminology used in some of the example presented below assumes that a third generation partnership program (3GPP) long-term evolution (LTE) system, or LTE-like system, is used. For example:

1) Transmitter LO-leakage (in case the radio units 15a-d are transmitter units): The LO-leakage from each transmitter unit will add in phase for a specific direction from the antenna array. Furthermore all LO-leakage energy will be concentrated on the same frequency, which will make the decoding in the UE of the information on that frequency challenging.

2) Receiver flicker noise (in case the radio units 15a-d are receiver units, direct conversion assumed): The RB:s (resource blocks) close to DC (after downconversion) will be affected by an increased NF (noise figure) due to flicker noise. If the same LO-frequency is used, then the degradation will be concentrated on the frequency range close to the used LO-frequency. This will especially be cumbersome if a relatively narrow frequency band is used, such as envisioned for some type of machine-type communication (MTC).

3) Receiver DC offset change due to AGC activity (in case the radio units 15a-d are receiver units, direct conversion assumed): The RB:s close to DC (after downconversion) will be affected by the DC-offset. The distortion will be added up, if the same LO frequency is used. The impact on system performance could be relatively high, e.g. if a reference signal, or pilot signal, is damaged.

4) Spurious response (in case the radio units 15a-d are receiver units). Due to spurious frequency components in the LO signals, e.g. due to leakage of other LO signals on the same integrated circuit chip, unwanted signal components will be down-converted to the same band as the wanted signal components and interfere with the wanted signal components, which is referred to as spurious response. The affected RB:s, being blocked by interfering signals, due to spurious response will be correlated between the different receiver units.

5) Spurious emission (in case the radio units 15a-d are transmitter units): Any (out of band) spurious emission related to TX LO-frequency, e.g. caused by unintentional mixing of the TX LO with some other clock signal due to leakage, will end up at same frequency for all radio units and add up in the air. This in turn could lead non-compliance with out-of band spectral emission requirements.

The inventor has realized that such problems can be reduced by operating different radio units at different LO frequencies. Hence, in accordance with some embodiments, the LO signal generation unit is configured to generate the plurality of LO signals LOa-d at distinct frequencies $f_{LOa}$-$f_{LOd}$.

Figure 2:
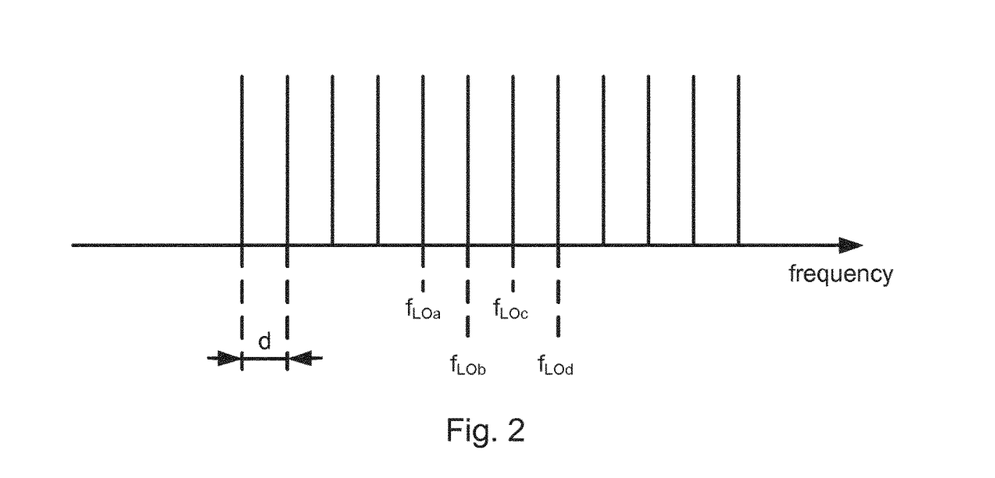
FIG. 2 illustrates subcarriers, subcarrier spacing, and LO frequencies.

According to some embodiments, the communication circuit 10 is configured to be used in a radio communications system having an associated frequency grid with a grid spacing d, wherein the spacing between any two of the distinct frequencies $f_{LOa}$-$f_{LOd}$ is an integer multiple of the grid spacing d. For example, an LTE system utilizes orthogonal frequency-division multiplexing (OFDM) signals, using a number of equally spaced sub carriers. In such a case, there is a frequency grid defined by the frequency positions of the sub carriers. The grid spacing d is a frequency distance between two adjacent OFDM subcarriers. This is illustrated in FIG. 2, illustrating an OFDM signal (in the frequency domain) with a number of sub carriers separated a distance d apart. FIG. 2 also illustrates how the frequencies $f_{LOa}$-$f_{LOd}$ can be selected to coincide with the sub carrier frequencies (at RF), whereby the spacing between any two of the distinct frequencies $f_{LOa}$-$f_{LOd}$ is an integer multiple of the grid spacing d. Such a frequency selection also ensures that the frequency grid of the OFDM symbol is aligned with DC, or 0 Hz, at baseband, which simplifies baseband processing. In FIG. 2, adjacent LO frequencies are only separated by a single d. However, any integer multiple of d may be used in other applications.

Figure 3:
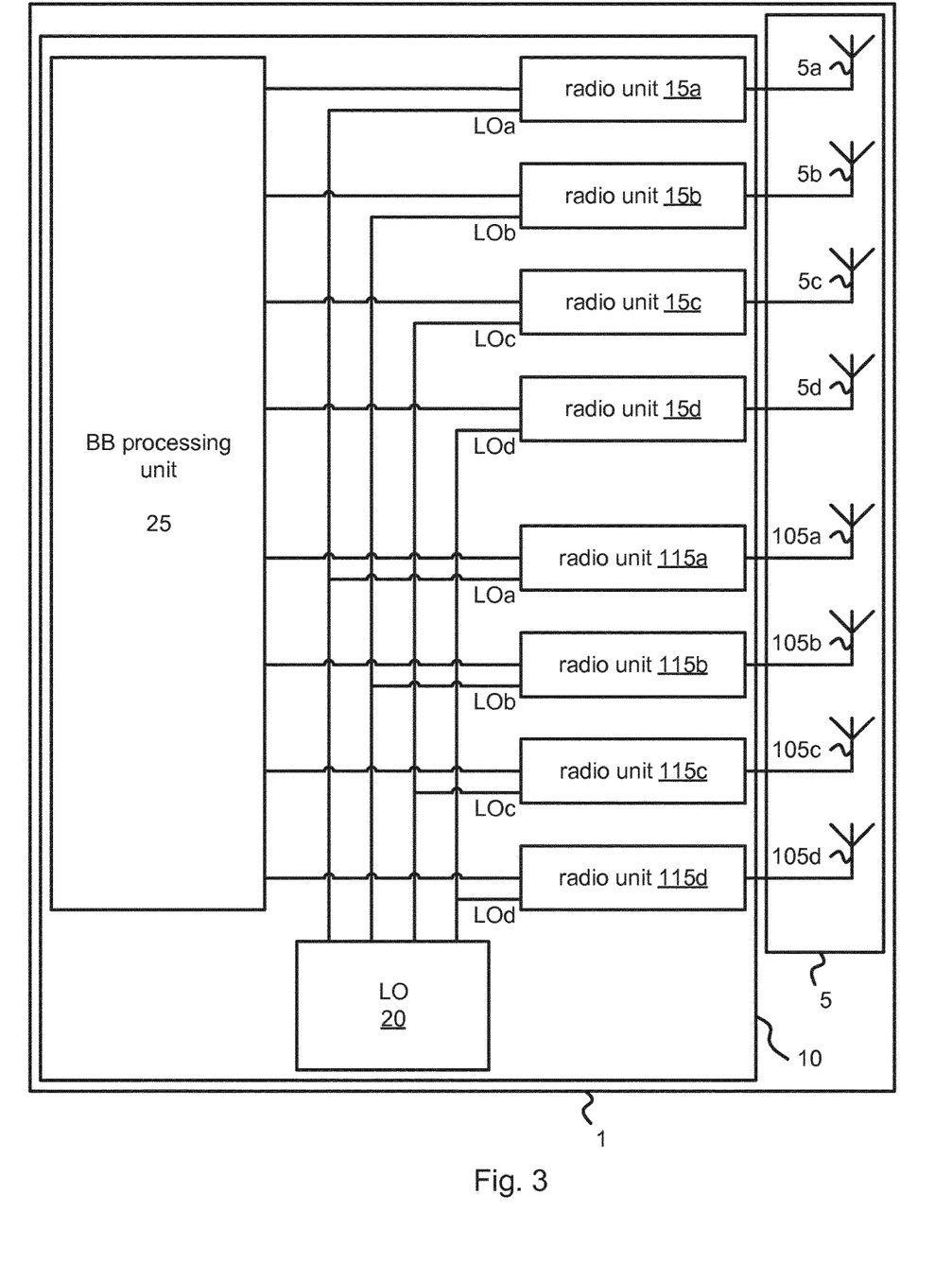
FIGS. 3-4 are block diagrams of a radio apparatus.

It should be noted that the communication circuit 10 may well comprise one or more additional pluralities of radio units, in addition to the radio units 15a-d. Such additional pluralities of radio units may reuse the same LO signals as the radio units 15a-d. This is illustrated in FIG. 3, showing an embodiment of the radio apparatus 1, wherein the communication circuit 10 comprises an additional plurality of radio units 115a-d. Furthermore, in FIG. 3, the antenna array 5 comprises an additional plurality of antenna elements 105a-d. In FIG. 3, only four antenna elements 105a-d in said additional plurality of antenna elements are depicted for simplicity. However, in practice, the number of antenna elements in said additional plurality of antenna elements may be much larger, such as several tens of antenna elements, or even over a hundred antenna elements.

In the embodiment illustrated in FIG. 3, each radio unit 115a-d is arranged to be connected to a separate antenna element 105a-d. In FIG. 3, the radio unit 115a is connected to the antenna element 105a, the radio unit 115b is connected to the antenna element 105b, the radio unit 115c is connected to the antenna element 105c, and the radio unit 115d is connected to the antenna element 105d. Furthermore, in FIG. 3, the radio units 115a-d reuse the LO signals LOa-d provided to the radio units 15a-d. The LO signal LOa is supplied to the radio unit 115a, the LO signal LOb is supplied to the radio unit 115b, the LO signal LOc is supplied to the radio unit 115c, and the LO signal LOd is supplied to the radio unit 115d.

The communication circuit 10 may in some embodiments be integrated into a single integrated circuit. In other embodiments, the communication circuit 10 may be partitioned into a number of integrated circuits. This can be particularly advantageous if the number of antenna elements in the antenna array 5 is relatively large, but also in cases with fewer antenna elements if the interspacing between the antenna elements is relatively large. A large number of antenna elements means a large number of radio units, which can make it difficult to integrate all of them into the same integrated circuit. Furthermore, it is generally advantageous to keep the radio units 15a-d (and 115a-d) physically close to the antenna elements 5a-d (and 105a-d) to which they are electrically connected, which is facilitated by partitioning the communication circuit 10 into multiple integrated circuits with one or more radio unit 15a-d (and 115a-d) in each. Furthermore, the LO signal generation unit 20 may be distributed over several integrated circuits as well. For example, a synthesizer, such as a PLL, of the LO signal generation unit 20 may be integrated into the same integrated circuit as the radio unit or radio units that it supplies with an LO signal, or into an integrated circuit that is place physically close thereto, e.g. in the same package or on the same printed circuit board. For instance, in some embodiments, each of the radio units 15a-d is implemented on a separate integrated circuit. With reference to FIGS. 1 and 3, the integrated circuit comprising the radio unit 15a may comprise a synthesizer of the LO signal generation unit 20 that generates the LO signal LOa, the integrated circuit comprising the radio unit 15b may comprise a synthesizer of the LO signal generation unit 20 that generates the LO signal LOb, the integrated circuit comprising the radio unit 15c may comprise a synthesizer of the LO signal generation unit 20 that generates the LO signal LOc, and the integrated circuit comprising the radio unit 15a may comprise a synthesizer of the LO signal generation unit 20 that generates the LO signal LOd. With reference to FIG. 3, the integrated circuit comprising the radio unit 15a may additionally comprise the radio unit 115a, the integrated circuit comprising the radio unit 15b may additionally comprise the radio unit 115b, the integrated circuit comprising the radio unit 15c may additionally comprise the radio unit 115c, and the integrated circuit comprising the radio unit 15d may additionally comprise the radio unit 115d.

Figure 4:
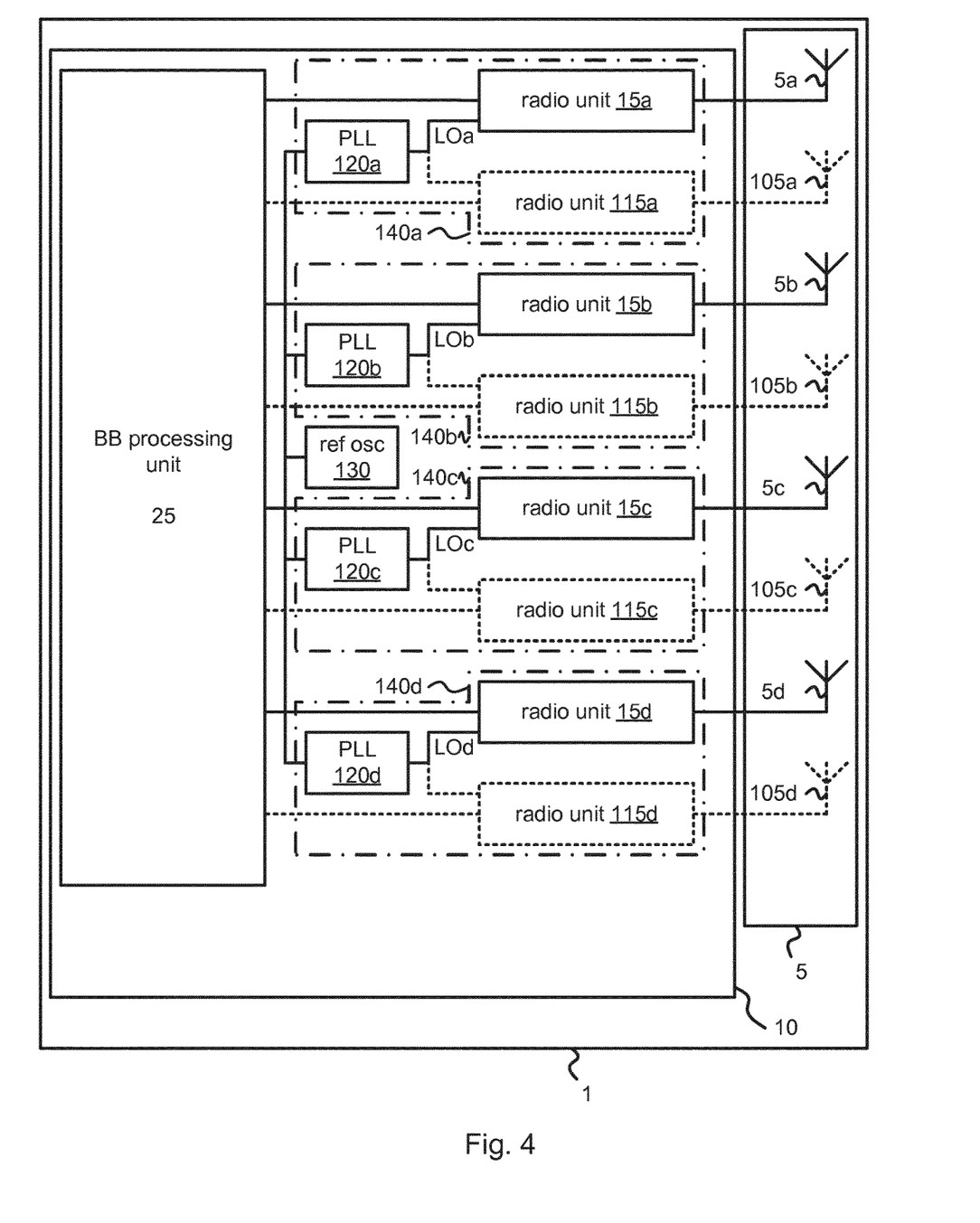

The partitioning discussed above is illustrated in FIG. 4. In FIG. 4, the radio unit 15a is located together with a PLL (or other type of synthesizer) 120a, which is configured to generate the LO signal LOa, in an integrated circuit 140a. Optionally, the radio unit 115a may be integrated in the same integrated circuit 140a. Similarly, in FIG. 4, the radio unit 15b is located together with a PLL (or other type of synthesizer) 120b, which is configured to generate the LO signal LOb, in an integrated circuit 140b. Optionally, the radio unit 115b may be integrated in the same integrated circuit 140b. In the same way, in FIG. 4, the radio unit 15c is located together with a PLL (or other type of synthesizer) 120c, which is configured to generate the LO signal LOc, in an integrated circuit 140c. Optionally, the radio unit 115c may be integrated in the same integrated circuit 140c. Also, in FIG. 4, the radio unit 15d is located together with a PLL (or other type of synthesizer) 120d, which is configured to generate the LO signal LOd, in an integrated circuit 140d. Optionally, the radio unit 115d may be integrated in the same integrated circuit 140d. The PLLs 120a-d are driven by a common reference oscillator, such as a crystal oscillator, 130. The PLLs 120a-d and the reference oscillator 130 are comprised in the LO signal generation unit 20 (FIGS. 1 and 3). The integrated circuits 140a-d mentioned above are below referred to as RF-ASICs 140a-d. The RF-ASICs 140a-d are placed physically close to the respective antennas 5a-d (and optionally the antennas 105a-d). In alternative embodiments, reference signs 140a-d may represent entities of a plurality of integrated circuits that are located close to each other, such as in the same integrated circuit package.

In a similar way, the baseband processing unit 25 may be integrated into a single integrated circuit, or may be distributed over multiple integrated circuits.

Figure 5:
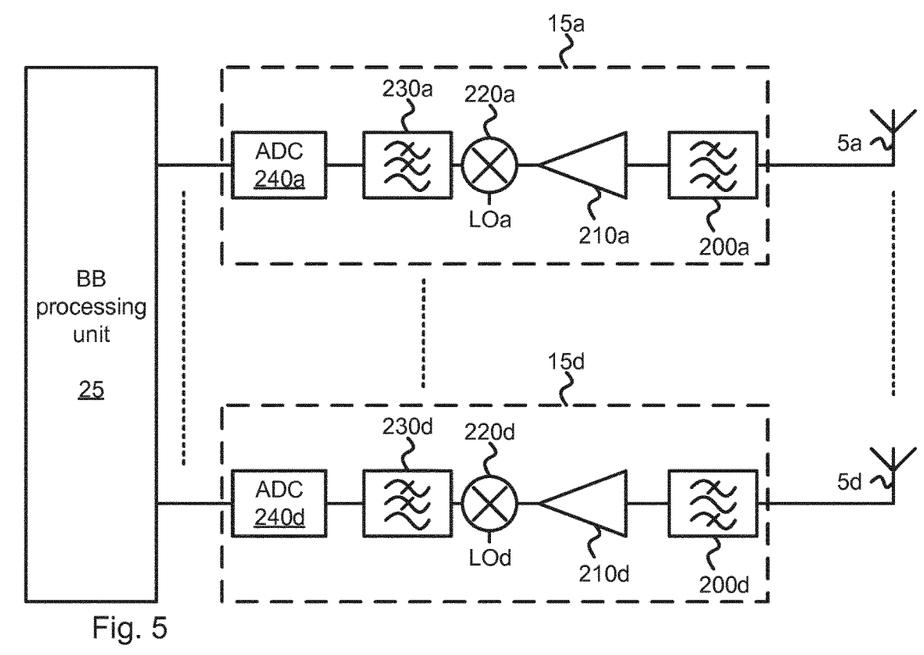
FIG. 5 is a block diagram of part of a radio apparatus with receiver units.

According to some embodiments, the radio units 15a-d are receiver units. In such embodiments, and the LO signals LOa-d may be supplied to down-conversion mixers of the respective receiver units 15a-d. This is illustrated with a block diagram in FIG. 5 showing part of the radio apparatus 1 according to an embodiment where the radio units 15a-d are receiver units 15a-d. In the following, a brief description of the receiver unit 15a, according to the embodiment illustrated in FIG. 5, is provided. The same description holds for the receiver units 15b-d by simply replacing "a" with "b", "c", or "d". Design of radio receivers in general is well known in the art, and therefore not described in great detail herein. In FIG. 5, the receiver unit 15a comprises an RF filter 200a connected to the antenna 5a. The receiver unit 15a in FIG. 5 further comprises an amplifier 210a, such as a low-noise amplifier (LNA), connected to the RF filter 200a. Furthermore, the receiver unit 15a in FIG. 5 comprises a down-conversion mixer 220a, configured to down convert the RF signal output from the amplifier 210a to a baseband signal. The LO signal LOa is supplied to the down-conversion mixer 220a.

In FIG. 5, the receiver unit 15a comprises a baseband filter 230a configured to suppress noise and other unwanted signal components outside of the signal band of the baseband signal, followed by an analog-to-digital converter 240a configured to convert the filtered baseband signal into a digital representation.

The baseband processing unit 25 is configured to receive the baseband output signals from the receiver units 15a-d, e.g. the digital baseband output signals generated by the ADCs 240a-240d (FIG. 5). These baseband signals are not aligned with each other in frequency, due to the use of different LO frequencies. Therefore, the baseband processing unit 25 may be configured to frequency align the baseband output signals, to facilitate further signal processing. In, for example, OFDM applications, such frequency alignment can be advantageously performed in the frequency domain. The digital baseband signals from the ADCs 240a-d can be transformed to the frequency domain, e.g. using a discrete Fourier transform (DFT), which may e.g. be implemented as a fast Fourier transform (FFT). The resulting frequency-domain signals can then be aligned by simply shifting the signals either up or down in frequency such that sub carriers, or "FFT bins", that correspond to the same subcarrier frequency appear in the same position in the frequency-shifted frequency-domain signals. The frequency alignment can also be performed in the time domain by multiplication with a sampled version of $e^{j\omega t}$, where j denotes the imaginary unit ($\sqrt{-1}$), $\omega$ is an angular frequency corresponding to the frequency shift to be achieved, and t denotes time.

Consider one of the receiver units, say 15a, implemented as a direct conversion receiver in an OFDM application. If the LO signal is placed on the frequency grid for the OFDM signal, then the DC-offset from the direct conversion receiver 15a will only affect one FFT bin. By averaging the bin at DC over a number of consecutive OFDM symbols, it will be possible to suppress the DC-offset after a certain time, e.g. after number of slots, wherein a slot corresponds to a number of consecutive OFDM symbols. During this time, the FFT bin at DC could be ignored for the particular receiver unit 15a, since data is received on the subcarrier corresponding to that bin also in the other receiver units 15b-d, which have used LO frequencies, that could be used for decoding of this specific subcarrier. The time needed until all FFT bins could be used again will e.g. depend on the modulation, which requires a certain signal-to-noise ratio (SNR) for successful de-coding.

The baseband processing unit 25 may further be configured to recombine the frequency-aligned baseband output signals that are the result of the frequency alignment. The recombining can be performed in the same way as if the same LO frequency had been used, and is therefore not described in any greater detail herein. Exactly how the signals are recombined depends on how the radio apparatus 1 is configured, and can e.g. be according to a beamforming scheme, multiple-input multiple-output (MIMO) scheme, or any other multi-antenna receiver scheme.

Figure 6:
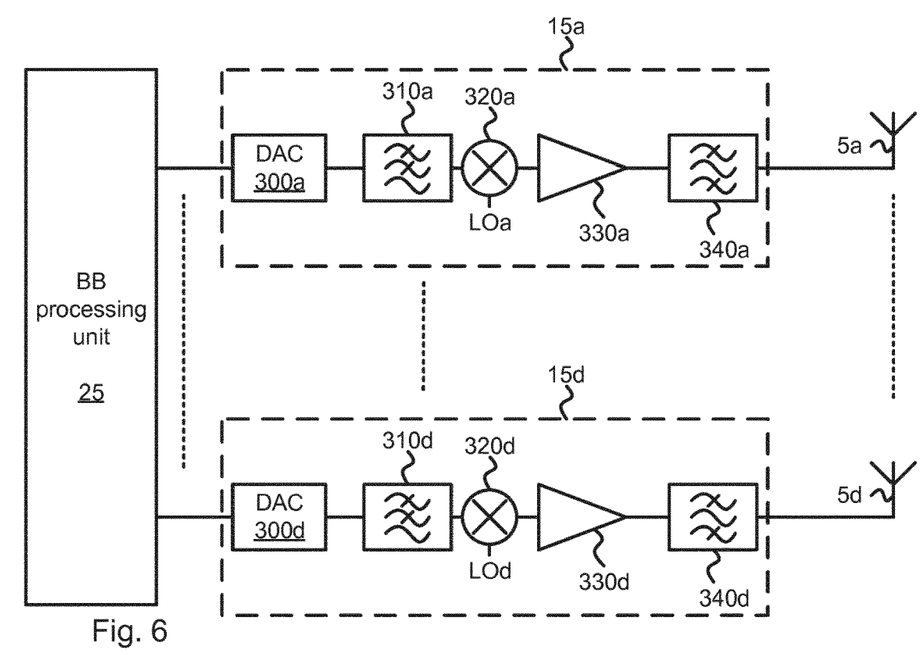
FIG. 6 is a block diagram of part of a radio apparatus with transmitter units.

According to some embodiments, the radio units 15a-d are transmitter units 15a-d. In such embodiments, the LO signals LOa-d may be supplied to up-conversion mixers of the respective transmitter units 15a-d. This is illustrated with a block diagram in FIG. 6 showing part of the radio apparatus 1 according to an embodiment where the radio units 15a-d are transmitter units 15a-d. In the following, a brief description of the transmitter unit 15a, according to the embodiment illustrated in FIG. 6, is provided. The same description holds for the transmitter units 15b-d by simply replacing "a" with "b", "c", or "d". Design of radio transmitters in general is well known in the art, and therefore not described in great detail herein. In FIG. 6, the transmitter unit 15a comprises a digital-to-analog converter (DAC) 300a, configured to convert a digital input signal of the transmitter unit 15a to the analog domain. The transmitter unit 15a depicted in FIG. 6 further comprises a reconstruction filter 310a, configured to suppress spectral replicas and other unwanted signal content outside of the signal band of the output signal of the DAC 300a. Furthermore, in FIG. 6, the transmitter unit 15a comprises an up-conversion mixer 320a configured to up convert the output signal from the reconstruction filter 310a to an RF signal. Moreover, in FIG. 6, the transmitter unit 15a comprises an amplifier 330a, such as a power amplifier (PA), configured to feed the RF signal from the up-conversion mixer 320a to the antenna 5a via an RF filter 340a of the transmitter unit 15a.

The baseband processing unit 25 is configured to generate input signals to the transmitter units 15a-d. Due to that the frequencies of the LO signals LOa-d are different, the input signals to the transmitter units should be frequency shifted the same amount, but in the opposite direction, such that signals transmitted via the antennas end up at the correct RF frequency. Accordingly, in some embodiments, the baseband processing unit 25 is configured to generate baseband transmit signals. This can be done in the same way as if all LO signals were using the same LO frequency, e.g. in accordance with a beamforming scheme or a MIMO scheme. Furthermore, the baseband processing unit 25 may be configured to frequency shift the baseband transmit signals to account for the distinct LO frequencies $f_{LOa}$-$f_{LOd}$. In, for example, OFDM applications, such frequency shifting can be advantageously performed in the frequency domain. For instance, if the baseband transmit signals are represented in the frequency domain by means of a DFT or FFT, the frequency shifting can be performed simply shifting the signals either up or down in frequency. The frequency-domain representation of the frequency-shifted baseband transmit signals can then be transformed into a time-domain representation, e.g. using an IFFT. Alternatively, as for the frequency alignment discussed above, the frequency shift can be performed in the time domain by multiplication with a sampled version of $e^{j\Omega t}$. The baseband processing unit 25 may further be configured to supply the frequency-shifted baseband transmit signals to the transmitter units 15a-d as the above-mentioned input signals.

It should be noted that the block diagrams in FIGS. 4 and 5 illustrating embodiments of receiver units 15a-d and transmitter units 15a-d are only examples. For example, the down-conversion mixer 220a and up-conversion mixer 320a are illustrated in FIGS. 4 and 5 as single mixers. However, in some embodiments, they may be implemented as quadrature mixers, comprising a mixer for an in-phase (I) signal path and a mixer for a quadrature-phase (Q) signal path. In such embodiments, the LO signal LOa is a quadrature LO signal having I and a Q component with a mutual 90-degree phase difference. The design of quadrature transmitters and receivers is well known in the art and not further described herein. Furthermore, other combinations of components, such as mixers, filters, and amplifiers, than those illustrated in FIGS. 4-5 may be used as well, while still benefitting from using distinct LO frequencies for different LO signals LOa-d.

Above, embodiments have been described, e.g. with reference to FIGS. 5-6, comprising either receiver units or transmitter units. These embodiments can be combined, resulting in embodiments of the communication circuit 10 which is a transceiver circuit, comprising both a plurality of transmitter units operating at distinct LO frequencies (e.g. as in FIG. 6), and a plurality of receiver units operating at distinct LO frequencies (e.g. as in FIG. 5), which may or may not be the same distinct LO frequencies as for the transmitter units.

According to one example, the radio apparatus 1 is a cellular base station configured to operate in a 3GPP band that starts at 4.5 GHz and ends at 4.9 GHz. The antenna array comprises 64 antenna elements. The communication circuit 10 comprises 32 RF application specific integrated circuits (ASICs). Each RF ASIC comprises two receiver units and two transmitter units that share the same LO signal, generated by a PLL comprised in the same RF ASIC. The LO frequencies used in the different are generated in increments of 1.005 MHz. The LO frequencies are given by $$\frac{4.5 + 4.9}{2}10^3 + N \cdot 1.005 \text{ MHz where} \quad (1)$$

$$N = -16, -15, \ldots, -1, 0, 1, \ldots, 14, 15 \quad (2)$$

1.005 MHz, which is an integer multiple (67) times the LTE subcarrier distance 15 kHz, has been used an example. Any other offset could be considered as well, such as 7, 34, or 134 times the subcarrier distance.

Compared with a radio apparatus where all radio units operate on the same LO frequency, the supported radio BW needs to be expanded in order to support the staggering of the LO frequency between different RF ASICs. In the example above it will mean an expansion of the bandwidth (BW) with a factor $$\frac{400 + (16 + 15)1.005}{400} \approx 1.078 \quad (3)$$

A 7.8% increase in BW, which can be seen as marginal. In another example, the offset is only one OFDM subcarrier distance. In LTE, that is 15 kHz, other distances may be used in future 5G systems, perhaps 75 kHz. In such an example, the BW increase would be so small that it can be seen as negligible, or almost none.

Figure 7:
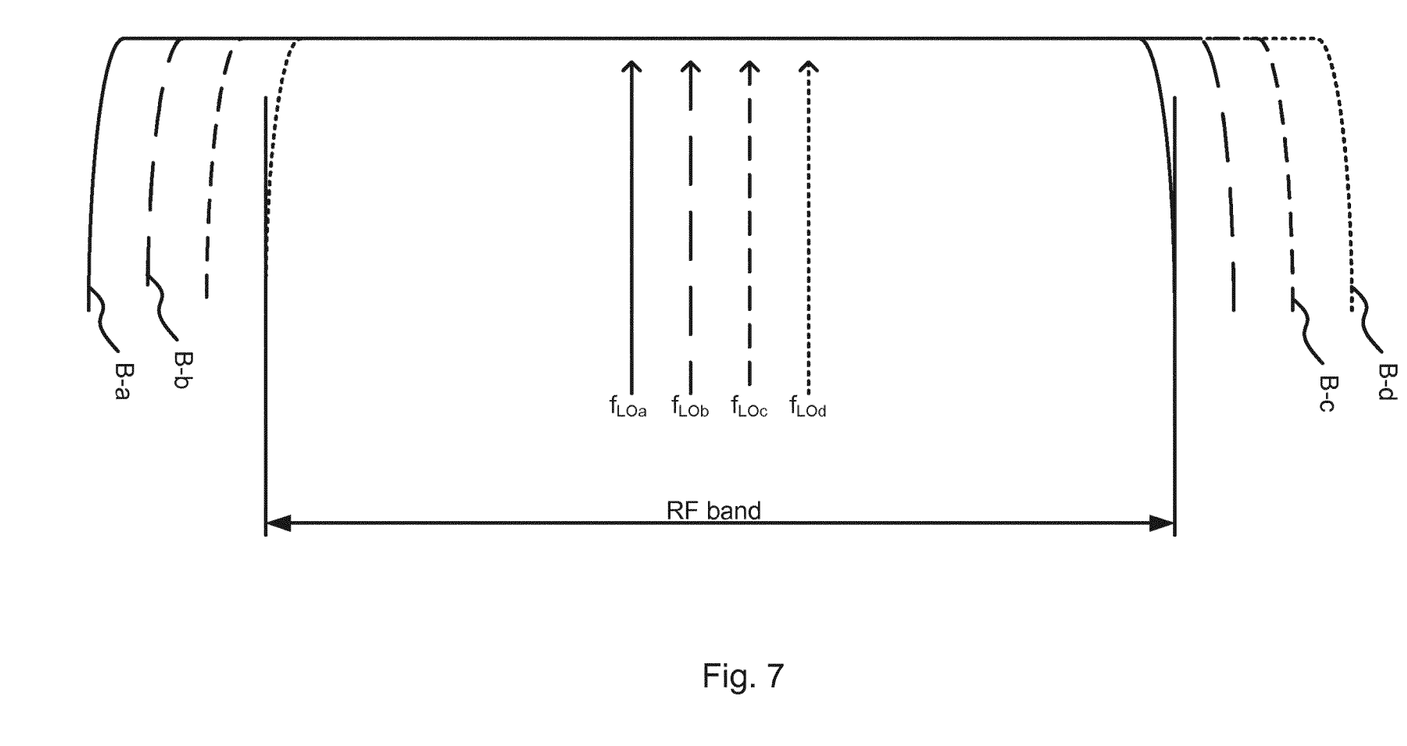
FIG. 7 illustrates bandwidths of radio units.

The BW increase described above is illustrated in FIG. 7. In FIG. 7, the LO signals LOa-d are illustrated as arrows located at the respective LO frequencies $f_{LOa}$-$f_{LOd}$. The radio unit 15a has an operational band B-a, in which it is capable of operating, in the RF domain centered at $f_{LOa}$. The radio unit 15b has an operational band B-b, in which it is capable of operating, in the RF domain centered at $f_{LOb}$. The radio unit 15c has an operational band B-c, in which it is capable of operating, in the RF domain centered at $f_{LOc}$. The radio unit 15d has an operational band B-d, in which it is capable of operating, in the RF domain centered at $f_{LOd}$. The radio units 15a-d are assumed to be identically designed and merely differ in terms of the LO frequency used. In particular, the bandwidth of the bands B-a, B-b, B-c, and B-d, are assumed to be the same. FIG. 7 also shows an RF band, such as a 3GPP band, in which the radio apparatus 1 is to operate in. In order for this RF band to be contained within each of the bands B-a, B-b, B-c, and B-d, the bandwidth of the bands B-a, B-b, B-c, and B-d need to be slightly higher than the bandwidth if the RF band itself, as can be seen from FIG. 7.

Figure 8:
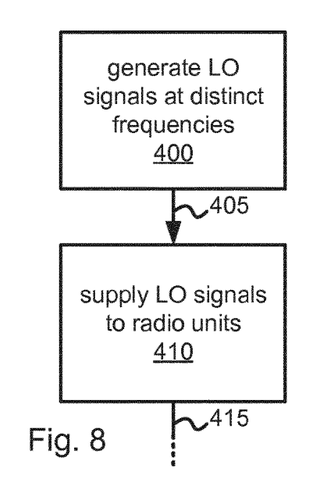
FIGS. 8-12 are flowcharts for methods of operating a radio apparatus.

According to some embodiments, there is provided a method of operating the radio apparatus 1 described above. As illustrated in FIG. 8, the method may comprise the step 400 of generating the above-mentioned plurality of LO signals LOa-d at distinct frequencies $f_{LOa}$-$f_{LOd}$. Furthermore, as also illustrated in FIG. 8, the method may comprise the step 410 of supplying a unique LO signal LOa-d of the plurality of LO signals LOa-d to each radio unit 15a-d of the plurality of radio units 15a-d. Reference signs 405 and 415 are inserted at nodes of the flowchart in FIG. 8, to illustrate how it connects with the flowcharts in FIGS. 9-12.

In some embodiments, as mentioned above, the radio units 15a-d are receiver units 15a-d. In such embodiments, the step 410 of supplying the LO signals LOa-d to the receiver units 15a-d may comprise a step 410a of supplying the LO signals LOa-d to down-conversion mixers, such as 220a-d in FIG. 5, of the receiver units 15a-d, as illustrated in FIG. 9.

Figures 9, 10:
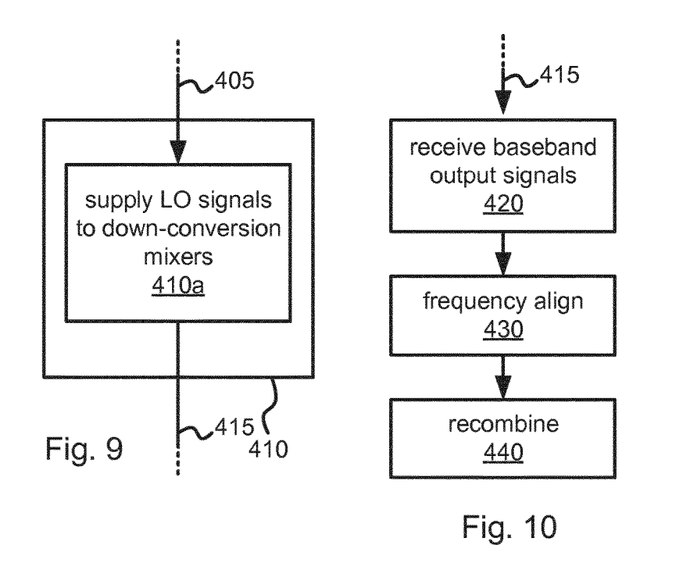

Furthermore, as illustrated in FIG. 10, and in line with what is described above regarding embodiments of the radio apparatus 1 where the radio units 15a-d are receiver units 15a-d, the method may further comprise step 420 receiving, e.g. by the baseband processing unit 25, baseband output signals from the receiver units 15a-d. Moreover, the method may comprise step 430 of frequency aligning, e.g. by the baseband processing unit 25, the baseband output signals. The method may also comprise step 440 of recombining, e.g. by the baseband processing unit 25, the frequency-aligned baseband output signals.

Figure 11:
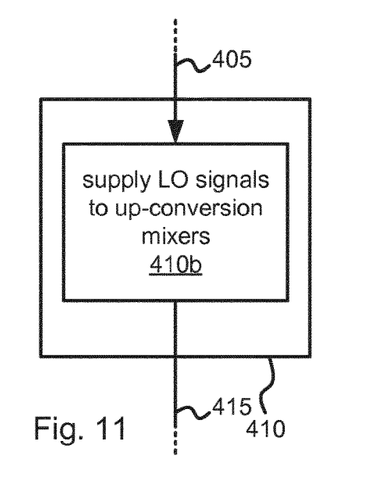

In some embodiments, as mentioned above, the radio units 15a-d are transmitter units 15a-d. In such embodiments, step 410 of supplying the LO signals LOa-d to the transmitter units 15a-d may comprise a step 410b of supplying the LO signals LOa-d to up-conversion mixers, such as 320a-d in FIG. 6, of the transmitter units 15a-d, as illustrated in FIG. 11.

Figure 12:
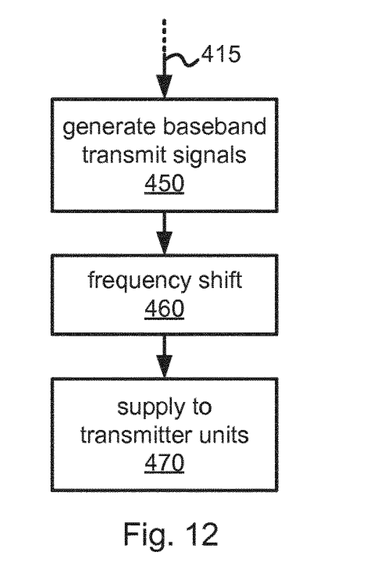

Furthermore, as illustrated in FIG. 12, and in line with what is described above regarding embodiments of the radio apparatus 1 where the radio units 15a-d are transmitter units 15a-d, the method may further comprise step 450 of generating, e.g. by the baseband processing unit 25, baseband transmit signals. Moreover, the method may comprise step 460 of frequency shifting, e.g. by the baseband processing unit 25, the baseband transmit signals to account for the distinct LO frequencies. The method may also comprise step 470 of supplying, e.g. by the baseband processing unit 25, the frequency-shifted baseband transmit signals to the transmitter units 15a-d.

Although the flowcharts in FIGS. 8-12 have been illustrated as a number of steps carried out in sequence, at least some of the steps, such as steps 400 and 410, are in practice continually ongoing processes carried out in parallel.

Some advantages of some embodiments are considered below.

A direct conversion transmitter and receiver generates spurious emission from the LO-leakage. Regulatory requirements on spurious emission is normally given as a maximum spurious power per a measurement bandwidth, such as 100 kHz or 1 MHz. By offsetting the LO frequencies in a staggered way, the spurious emission from all radio units will not end up in the same band. Thus, maximum spurious emission in the measurement bandwidth is reduced, thereby facilitating meeting the regulatory requirements on spurious emission.

A direct conversion transmitter unit generates LO leakage. By adding a staggering offset of the LO frequencies, for instance by multiples of 15 kHz in 3GPP LTE system, it will be possible to spread out the LO leakage on multiple OFDM subcarriers. The requirement on the LO-leakage due to required SNR for good decoding of the information in the UE will then be relaxed.

The effective SNR of a received signal is set by averaging the noise from each receiver unit. By adding a staggering offset to the LO frequencies, e.g. multiples of 1.005 MHz as used in the example above, it will be possible to secure that the increased NF close to the LO due to flicker noise from each receiver unit will not be added together at a specific frequency range. Thereby, decoding errors of the subcarriers closest to the LO frequency (at RF) can be reduced or avoided.

A direct conversion receiver unit adds a DC-offset to a received signal. The DC-offset could be removed by averaging in the time domain (e.g. using a high-pass filter) or after the FFT if the LO signal is placed on the FFT grid. In a steady state it will be possible to suppress the DC-offset to level that will not influence the system performance. However, in practice, the receiver units will need to vary their gains, e.g. due to blocking interferers. Such varying of the gains may cause a modification of the DC offset as well. The suppression of the new DC-offset will take some time converge. During that time it could result in that the FFT bin on DC-frequency cannot be decoded. By adding a small staggering offset to the LO for each receiver unit, or for each RF ASIC, for example multiples of 15 kHz for 3GPP LTE system, it will result in that different FFT bins will be effaced from the DC-offset in different receiver units. The FFT bin at DC could be ignored for a time period after a gain change. This will have minimal impact on the system, since different radio units or RF ASICs will have their LO signals placed at different FFT bins. For example, in the example the specific example described above with 64 antenna elements, it will mean that 2 receivers out of 64 will not receive any data on a specific FFT bin during the time it take to estimate a new Dc-offset.

The mixer in a receiver unit has a spurious response, e.g. at three times the LO frequency. By using different LO-frequencies in the different receiver units or RF ASICs, it is possible to spread out the spurious response energy over different frequency ranges for the different receivers. There will be an improvement for any spurious response related to the LO frequency.

By using different LO-frequencies in the different transmitter units or RF ASICs, it will be possible to spread out the spurious emission energy over different frequency range for the different transmitter units, when it comes to spurious emissions that are related to the LO frequency.

Standardization is ongoing within 3GPP for narrowband (NB) systems that should coexist with existing wider bandwidth systems, e.g. LTE. For example, such NB systems are developed particularly for MTC and internet of things (IoT). If such an NB system needs to be supported, embodiments of the present invention may facilitate relaxed specifications for image suppression. By using different LO frequencies $f_{LOa}$-$f_{LOd}$ in different radio units 15*a-d*, or in different RF-ASICs 140*a-d*, a narrow band interferer, e.g. in narrow band blocking test case, will give an image that will be at a different frequency for each radio unit 15*a-d*, or RF-ASIC 140*a-d*. Such a narrowband interferer may otherwise block the whole signal band for the narrowband system, in case the image coincides with the signal band.

The present invention has been described above with reference to specific embodiments. However, other embodiments than the above described are possible within the scope of the invention. Different method steps than those described above, may be provided within the scope of the invention. The different features and steps of the embodiments may be combined in other combinations than those described. The scope of the invention is only limited by the appended patent claims.

The invention claimed is:

1. A communication circuit for communication at a carrier frequency via multiple antenna elements of a radio apparatus, the communication circuit comprising:
   a plurality of radio units, wherein each radio unit of the plurality of radio units is connected to a separate antenna element;
   a local oscillator (LO) signal generation unit configured to generate a plurality of LO signals at distinct frequencies and supply a unique LO signal of the plurality of LO signals to said each radio unit of the plurality of radio units, wherein the plurality of radio units are receiver units, and the plurality of LO signals are supplied to down-conversion mixers of the respective receiver units; and
   a baseband processing unit configured to:
      receive baseband output signals from the receiver units;
      frequency align the baseband output signals; and
      recombine the frequency-aligned baseband output signals.

2. The communication circuit according to claim 1, wherein the communication circuit is configured to be used in a radio communications system having an associated frequency grid with a grid spacing, and wherein a spacing between any two of the distinct frequencies is an integer multiple of the grid spacing.

3. The communication circuit according to claim 2, wherein the radio communications system utilizes orthogonal frequency division multiplexing (OFDM) and the grid spacing is a frequency distance between two adjacent OFDM subcarriers.

4. The radio apparatus comprising:
   an antenna array comprising the multiple antenna elements; and
   the communication circuit according to claim 1; wherein said each radio unit of the plurality of radio units of the communication circuit is connected to a unique one of the multiple antenna elements of the antenna array.

5. The radio apparatus according to claim 4, wherein the radio apparatus is a base station for a cellular communications system.

6. A communication circuit for communication at a carrier frequency via multiple antenna elements of a radio apparatus, the communication circuit comprising:
   a plurality of radio units, wherein each radio unit of the plurality of radio units is connected to a separate antenna element;
   a local oscillator (LO) signal generation unit configured to generate a plurality of LO signals at distinct frequencies and supply a unique LO signal of the plurality of LO signals to said each radio unit of the plurality of radio units, wherein the plurality of radio units are transmitter units, and the plurality of LO signals are supplied to up-conversion mixers of the respective transmitter units; and
   a baseband processing unit configured to:

generate baseband transmit signals;
frequency shift the baseband transmit signals to account for the distinct frequencies; and
supply the frequency-shifted baseband transmit signals to the transmitter units.

7. The communication circuit according to claim 6, wherein the communication circuit is configured to be used in a radio communications system having an associated frequency grid with a grid spacing, and wherein a spacing between any two of the distinct frequencies is an integer multiple of the grid spacing.

8. The communication circuit according to claim 7, wherein the radio communications system utilizes orthogonal frequency division multiplexing (OFDM) and the grid spacing is a frequency distance between two adjacent OFDM subcarriers.

9. The radio apparatus comprising:
an antenna array comprising the multiple antenna elements; and
the communication circuit according to claim 6, wherein said each radio unit of the plurality of radio units of the communication circuit is connected to a unique one of the multiple antenna elements of the antenna array.

10. The radio apparatus according to claim 9, wherein the radio apparatus is a base station for a cellular communications system.

11. A method of operating a radio apparatus comprising an antenna array with a plurality of antenna elements and a communication circuit for communication at a carrier frequency via the plurality of antenna elements, wherein the communication circuit comprises a plurality of radio units, each radio unit of the plurality of radio units connected to a separate antenna element, the method comprising:
generating a plurality of local oscillator (LO) signals at distinct frequencies;
supplying a unique LO signal of the plurality of LO signals to said each radio unit of the plurality of radio units, wherein the plurality of radio units are receiver units, and supplying the plurality of LO signals to the receiver units comprises supplying the plurality of LO signals to down-conversion mixers of the receiver units; and
receiving baseband output signals from the receiver units;
frequency aligning the baseband output signals; and
recombining the frequency-aligned baseband output signals.

12. The method according to claim 11, wherein the communication circuit is configured to be used in a radio communications system having an associated frequency grid with a grid spacing, and wherein a spacing between any two of the distinct frequencies is an integer multiple of the grid spacing.

13. The method according to claim 12, wherein the radio communications system utilizes orthogonal frequency division multiplexing (OFDM) and the grid spacing is a frequency distance between two adjacent OFDM subcarriers.

14. A method of operating a radio apparatus comprising an antenna array with a plurality of antenna elements and a communication circuit for communication at a carrier frequency via the plurality of antenna elements, wherein the communication circuit comprises a plurality of radio units, each radio unit of the plurality of radio units connected to a separate antenna element, the method comprising:
generating a plurality of local oscillator (LO) signals at distinct frequencies;
supplying a unique LO signal of the plurality of LO signals to said each radio unit of the plurality of radio units, wherein the plurality of radio units are transmitter units, and supplying the plurality of LO signals to the transmitter units comprises supplying the plurality of LO signals to up-conversion mixers of the transmitter units;
generating baseband transmit signals;
frequency shifting the baseband transmit signals to account for the distinct frequencies; and
supplying the frequency-shifted baseband transmit signals to the transmitter units.

15. The method according to claim 14, wherein the communication circuit is configured to be used in a radio communications system having an associated frequency grid with a grid spacing, and wherein a spacing between any two of the distinct frequencies is an integer multiple of the grid spacing.

16. The method according to claim 15, wherein the radio communications system utilizes orthogonal frequency division multiplexing (OFDM) and the grid spacing is a frequency distance between two adjacent OFDM subcarriers.

* * * * *